US011640375B2

(12) United States Patent
Hiregoudar et al.

(10) Patent No.: US 11,640,375 B2
(45) Date of Patent: May 2, 2023

(54) AVOIDING DATA INCONSISTENCY IN A FILE SYSTEM USING 2-LEVEL SYNCHRONIZATION

(71) Applicant: VMWARE, INC., Palo Alto, CA (US)

(72) Inventors: Mahesh Hiregoudar, Bangalore (IN); Prasanna Aithal, Bangalore (IN); Prasad Rao Jangam, Palo Alto, CA (US); Srinivasa Shantharam, Bangalore (IN); Rohan Pasalkar, Palo Alto, CA (US); Srikanth Mahabalarao, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/398,065

(22) Filed: Aug. 10, 2021

(65) Prior Publication Data

US 2022/0414060 A1    Dec. 29, 2022

(30) Foreign Application Priority Data

Jun. 23, 2021 (IN) .............................. 202141028268

(51) Int. Cl.
*G06F 16/178* (2019.01)
*G06F 16/17* (2019.01)
*G06F 16/188* (2019.01)
*G06F 16/176* (2019.01)

(52) U.S. Cl.
CPC ........ *G06F 16/178* (2019.01); *G06F 16/1727* (2019.01); *G06F 16/1774* (2019.01); *G06F 16/188* (2019.01)

(58) Field of Classification Search
CPC .. G06F 16/178; G06F 16/188; G06F 16/1774; G06F 16/1727
See application file for complete search history.

(56) References Cited

U.S. PATENT DOCUMENTS

| 6,789,156 | B1 * | 9/2004 | Waldspurger | ....... G06F 12/1018 718/1 |
| 2014/0195725 | A1 * | 7/2014 | Bennett | ............... G06F 12/0246 711/103 |
| 2016/0070652 | A1 * | 3/2016 | Sundararaman | ...... G06F 3/0647 711/154 |
| 2018/0032541 | A1 * | 2/2018 | Park | ...................... G06F 16/122 |
| 2018/0267894 | A1 * | 9/2018 | Jangam | .................. G06F 3/0608 |
| 2020/0004993 | A1 * | 1/2020 | Volos | .................. G06F 21/577 |
| 2020/0150865 | A1 * | 5/2020 | Krishnamurthy | ..... G06F 3/0611 |

* cited by examiner

*Primary Examiner* — James Trujillo
*Assistant Examiner* — Michal Bogacki
(74) *Attorney, Agent, or Firm* — Kim & Stewart LLP

(57) ABSTRACT

A method of synchronously executing input/output operations (IOs) for a plurality of applications using a storage device with a file system includes the steps of: receiving a first write IO including an instruction to write first data at a first address of the file system; determining that, within a first range of the file system comprising the first address, there are no pending unmap IOs for deallocating storage space of the storage device from files of the plurality of applications; after determining that there are no pending unmap IOs within the first range, locking the first range to prevent incoming unmap IOs from deallocating storage space within the first range from the files of the plurality of applications; after locking the first range, writing the first data to the storage device at the first address; and after writing the first data, unlocking the first range.

20 Claims, 5 Drawing Sheets

AVOIDING DATA INCONSISTENCY IN A FILE SYSTEM USING 2-LEVEL SYNCHRONIZATION

RELATED APPLICATION

Benefit is claimed under 35 U.S.C. 119(a)-(d) to Foreign Application Ser. No. 202141028268 filed in India entitled "AVOIDING DATA INCONSISTENCY IN A FILE SYSTEM USING 2-LEVEL SYNCHRONIZATION", on Jun. 23, 2021, by VMware, Inc., which is herein incorporated in its entirety by reference for all purposes.

BACKGROUND

A storage device with a file system may employ thin provisioning of its physical resources. Instead of statically allocating physical storage capacities to files of applications, such a storage device increases and decreases the storage capacities of files on demand, which helps to avoid wasted storage. A storage device that employs thin provisioning may support both write and unmap input/output operations (IOs). Applications may issue write IOs to write data to files of the storage device and unmap IOs to deallocate storage space from the files in units such as 1-MB data blocks. When the storage device deallocates data blocks, the storage device should also zero the data blocks by deleting previously stored information.

However, a storage device that supports write and unmap IOs may not synchronize the execution of the IOs, which may result in data inconsistencies. Specifically, the storage device may inadvertently write data to an unmapped data block or unmap a data block that is currently being written to. For example, a first application may issue a write IO to a previously-allocated data block. Later, the first application may issue an unmap IO to deallocate the data block from a file of the first application. With no synchronization, the net state of the data block may be determined by a "race" between the write and unmap IOs, i.e., determined by the order in which the storage device completes the IOs. If the write IO is delayed by, e.g., a hardware glitch, the storage device may first complete the unmap IO. The storage device may then allocate the unmapped data block to a file of a second application before the storage device completes the first application's write IO. When the storage device eventually writes data from the write IO to the data block, the data block will be corrupted because the data stored will be inconsistent with what the second application expects. An efficient synchronization method that prevents such data inconsistency problems is needed.

SUMMARY

Accordingly, one or more embodiments provide a method of synchronously executing IOs for a plurality of applications using a storage device with a file system. The method includes the steps of: receiving a first write including an instruction to write first data at a first address of the file system; determining that, within a first range of the file system comprising the first address, there are no pending unsnap IOs for deallocating storage space of the storage device from files of the plurality of applications; after determining that there are no pending unmap IOs within the first range, locking the first range to prevent incoming unmap IOs from deallocating storage space within the first range from the files of the plurality of applications; after locking the first range, writing the first data to the storage device at the first address; and after writing the first data, unlocking the first range.

Further embodiments include a non-transitory computer-readable storage medium comprising instructions that cause a computer system to carry out the above method, as well as a computer system configured to carry out the above method.

DETAILED DESCRIPTION

Figure 1:
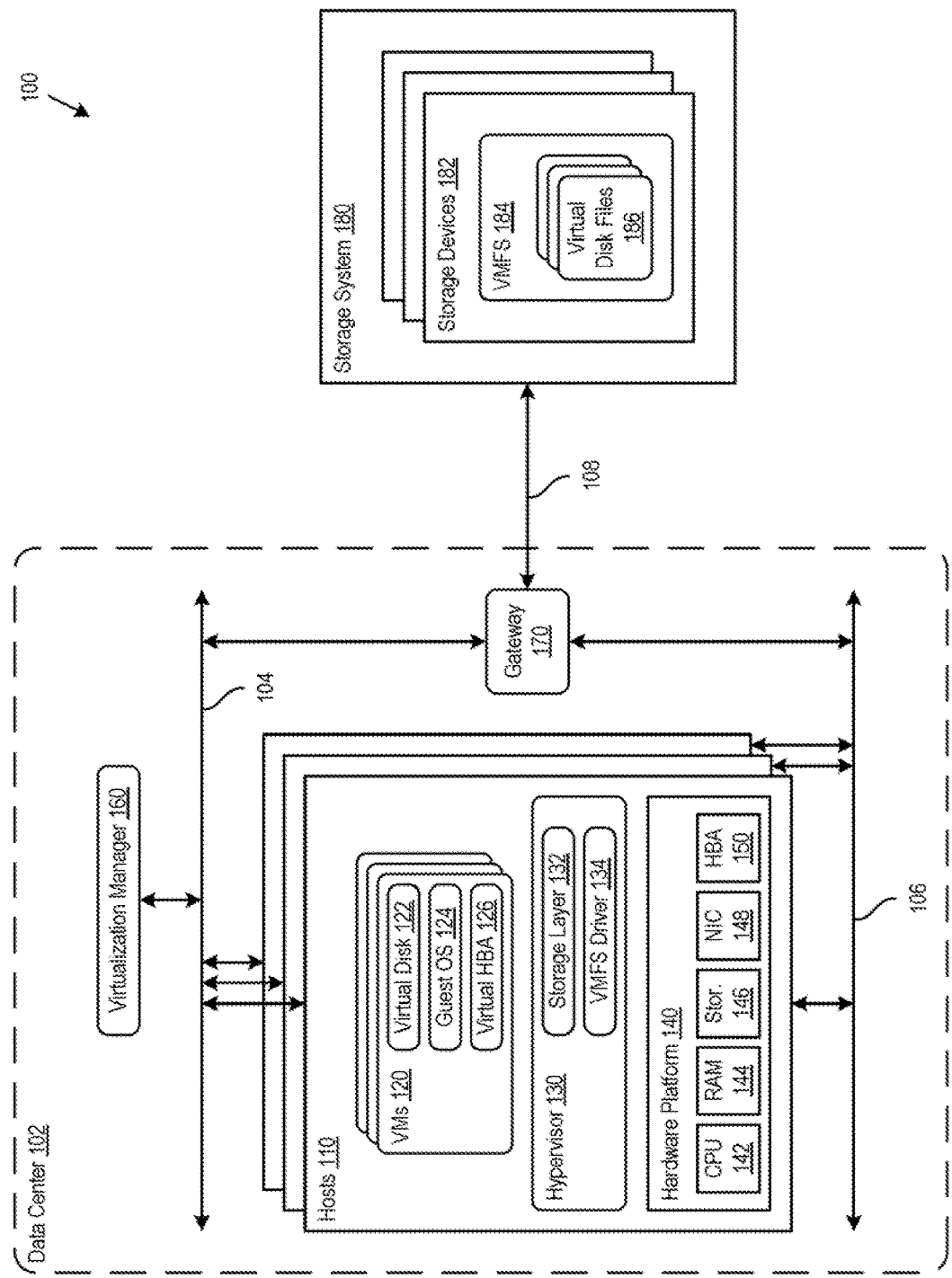
FIG. 1 is a block diagram of a virtualized computing system in which one or more embodiments of the present invention may be implemented.

FIG. 1 is a block diagram of a virtualized computing system 100 in which one or more embodiments of the present invention may be implemented. Virtualized computing system 100 comprises a data center 102 connected to a storage system 180 over a network 108. Network 108 may be, e.g., a local area network (LAN), wide area network (WAN), storage area network (SAN), or combination of networks. Although storage system 180 is depicted as being located outside of data center 102 and accessible via a gateway 170, storage system 180 may instead be located within data center 102 and accessible without gateway 170.

Data center 102 includes a cluster of hosts 110, virtualization manager 160, management network 104, and data network 106. Although management network 104 and data network 106 are depicted as separate physical LANs, management and data networks may instead be logically isolated from the same physical LAN using different virtual local area network (VLAN) identifiers.

Each host 110 may be constructed on a server grade hardware platform 140 such as an x86 hardware platform. For example, hosts 110 may be geographically co-located servers on the same rack. Hardware platform 140 of each host 110 includes a central processing unit (CPU) 142, system memory such as random-access memory (RAM) 144, storage 146, a network interface card (NIC) 148, and a host bust adapter (HBA) 150. CPU 142 executes instructions that perform one or more operations described herein and that may be stored in RAM 144 and storage 146. RAM 144 is where programs and data are stored that are being actively used by CPU 142. Storage 146 comprises one or more persistent storage devices such as hard disk drives (HDDs), solid-state drives (SSDs), and optical disks. NIC 148 enables a host 110 to communicate with other devices over management network 104 and data network 106. HBA 150 couples hosts 110 to storage system 180.

Each host 110 includes a hypervisor 130, which is a virtualization software layer that abstracts hardware resources of hardware platform 140 for concurrently running virtual machines (VMs) 120. Although the disclosure is described with reference to VMs, the teachings herein also apply to nonvirtualized applications and to other types of virtual computing instances such as containers, Docker containers, data compute nodes, isolated user space instances, and the like for which a storage device employs thin provisioning. One example of a hypervisor 130 that may be used is a VMware ESXi™ hypervisor from VMware, Inc.

Virtualization manager 160 communicates with hosts 110 via management network 104 to perform administrative tasks such as managing hosts 110, managing VMs 120, provisioning VMs 120, migrating VMs 120 from one host 110 to another, and load balancing between hosts 110. Virtualization manager 160 may be a computer program that resides and executes in a server or, in other embodiments, a VM executing in one of hosts 110. One example of a virtualization manager is the VMware vCenter Server™ from VMware, Inc.

Gateway 170 provides components in data center 102, including VMs 120, with connectivity to network 108. Gateway 170 manages external public IP addresses for VMs 120, routes traffic incoming to and outgoing from data center 102, and provides networking services such as firewalls, network translation (NAT), dynamic host configuration protocol (DHCP), and load balancing over management network 104 and data network 106. Gateway 170 may be a physical device, or, in other embodiments, a software module running within one of hosts 110. Gateway 170 may also include two separate gateways: one for management network 104 and another for data network 106.

Storage system 180 comprises a plurality of storage devices 182. A storage device 182 is a persistent storage device such as an HDD, SSD, flash memory module, or optical drive. Virtualized computing system 100 implements a virtual machine file system (VMFS) 184 on each storage device 182. VMFS 184 is implemented throughout virtualized computing system 100 and is controlled by instances of VMFS driver 134 in hypervisors 130. Although the disclosure is described with reference to a VMFS, the teachings herein also apply to thin provisioning of files of other file systems.

Each VM 120 includes a virtual disk 122, guest operating system (OS) 124, and virtual HBA 126. Each virtual disk 122, also referred to as a "volume" or "AppStack," is associated with a virtual disk file 186 in a storage device 182. A virtual disk 122 exposes a VM 120 to an abstraction of the associated physical storage device 182. From the perspective of a guest OS 124, calls by the guest OS 124 to storage system 180 appear to only be routed to virtual disk 122. However, such calls to virtual disk 122 pass through virtual HBA 126 to hypervisor 130, and hypervisor 130 translates the calls to virtual disk 122 into calls to virtual disk files 186. An HBA emulator (not shown) within hypervisor 130 enables the necessary data transfer and control operations, which hypervisor 130 passes to HBA 150 for transmission to storage system 180. Virtual disk 122 is thus merely a logical abstraction of a storage disk, a virtual disk file 186 storing actual data that is associated with virtual disk 122. Virtual disk files 186 may be stored, e.g., in logical volumes or logical unit numbers (LUNs) exposed by storage system 180. In embodiments described herein, virtual disk files 186 are thin-provisioned. As such, storage space in storage devices 182 are allocated to files of VMs 120 on demand.

Hypervisor 130 includes a storage layer 132 configured to manage storage space persistently for VMs 120. While storage layer 132 is depicted as part of a virtualized architecture, storage layer 132 may also be implemented as a filesystem driver of an OS that manages storage space persistently for locally attached storage. In one embodiment, storage layer 132 includes numerous logical layers, including an IO virtualization layer. The JO virtualization layer receives IOs intended for a virtual disk 122, e.g., write and unmap IOs. The IO virtualization layer converts the IOs into filesystem operations that are understood by a VMFS driver 134. The IO virtualization layer then issues the filesystem operations to VMFS driver 134 to access virtual disk files 186.

VMFS driver 134 manages the creation, use, and deletion of virtual disk files 186. VMFS driver 134 converts filesystem operations received from the IO virtualization layer of storage layer 132 to raw small computer system interface (SCSI) operations, which are issued to a data access layer (not shown). The data access layer applies command queuing and scheduling policies to the raw SCSI operations before sending the operations to hardware platform 140 to be further transmitted to storage system 180. The write and unmap IOs performed by storage devices 182 are thus SCSI write and unmap commands.

Figure 2:
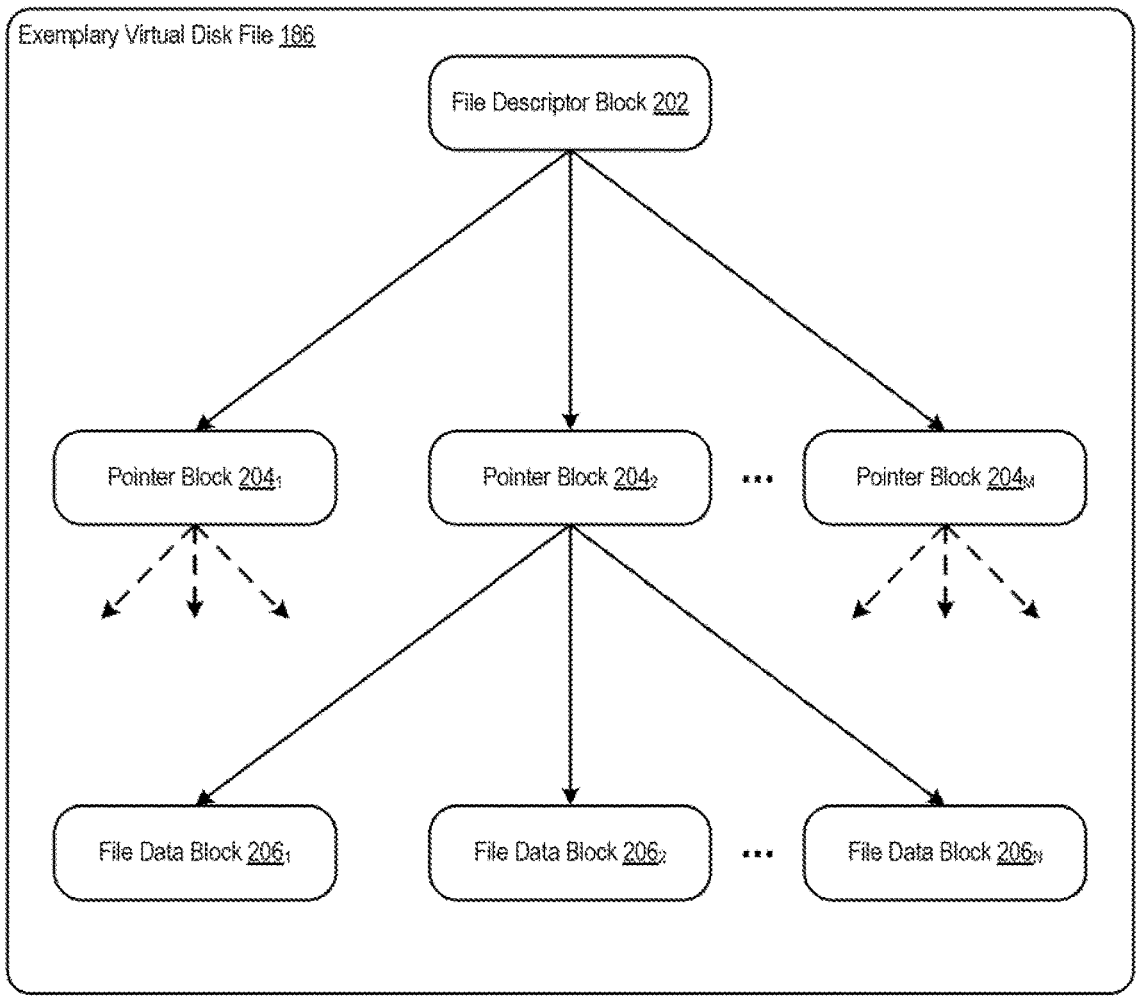
FIG. 2 is a block diagram of an exemplary virtual disk file of a virtual machine file system, according to an embodiment.

FIG. 2 is a block diagram of an exemplary virtual disk file 186 of a VMFS 184, according to an embodiment. Virtual disk file 186 comprises a file descriptor block 202, pointer blocks 204, and file data blocks 206.

File descriptor block 202 may be, e.g., a data object within a 1-MB block of storage device 182. File descriptor block 202 is a root of virtual disk file 186, e.g., an inode. File descriptor block 202 stores metadata of virtual disk file 186 including, e.g., the sizes, ownerships, and types of a plurality of files of storage device 182. File descriptor block 202 also stores addresses of pointer blocks 204, i.e., points to pointer blocks 204. The addresses may be logical or physical addresses. A logical address is an address at which data appears to reside from the perspective of a guest OS 124 of a VM 120. A logical address is translated or mapped to a physical address of storage device 182.

A pointer block 204 may be, e.g., a data object within a 1-MB block of storage device 182. In FIG. 2, each pointer block 204 contains metadata of virtual disk file 186, including logical or physical addresses of a plurality of file data blocks 206. For example, pointer block $204_2$ points to file data blocks $206_1$, $206_2$, and $206_N$. Although FIG. 2 only shows a single layer of pointer blocks 204, virtual disk file 186 may contain several layers of pointer blocks 204. For example, virtual disk file 186 may contain two layers of pointer blocks 204, the pointer blocks 204 in a first layer pointing to the pointer blocks 204 in a second layer, and the pointer blocks 204 in the second layer pointing to file data blocks 206. Each pointer block 204 also includes metadata indicating whether file data blocks 206 pointed to by the pointer block 204 have been zeroed. As used herein, zeroing a file data block 206 involves storing zeros in each data storage position of the file data block 206. In an embodiment, zeroing of a file data block 206 is performed in response to an unmap IO. Additional metadata of pointer blocks 204 are discussed below in conjunction with FIG. 3.

File data blocks 206 contain data of virtual disk file 186 that VMs 120 utilize directly. A file data block 206 may be, e.g., a 1-MB block of storage device 182. Read and write IOs issued by VMs 120 to storage device 182 read data from and write data to file data blocks 206, respectively. File data blocks 206 that are pointed to by a pointer block 204 are "downstream" of that pointer block 204. For example, file data block 206₁ is downstream of pointer block 204₂, but not downstream of pointer block 204₁.

Figure 3:
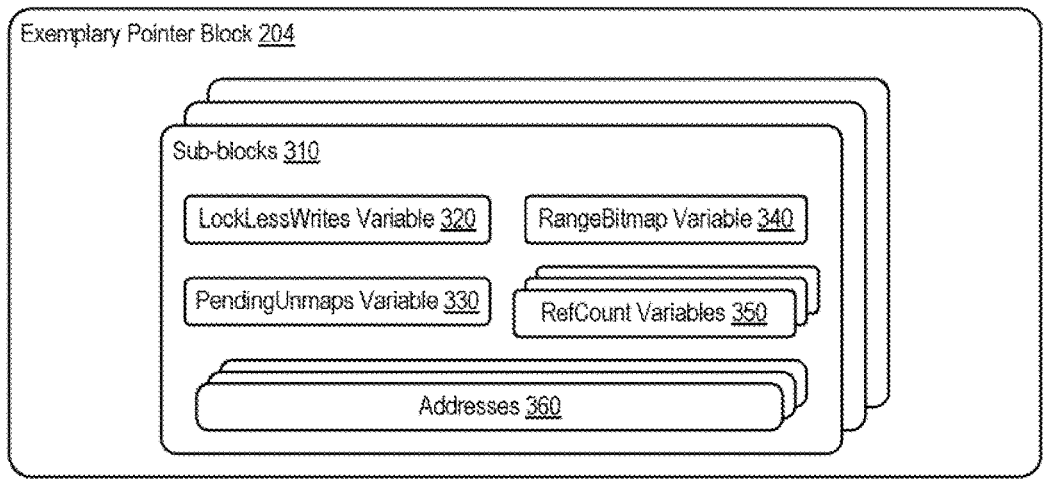
FIG. 3 is a block diagram of an exemplary pointer block of a virtual disk file, according to an embodiment.

FIG. 3 is a block diagram of an exemplary pointer block 204 of a virtual disk file 186, according to an embodiment. Pointer block 204 is subdivided into sub-blocks 310, each sub-block 310 comprising file data block addresses 360 of downstream file data blocks 206. Each sub-block 310 may contain, e.g., up to 512 addresses 360, each address 360 corresponding to a different file data block 206. Each sub-block 310 further comprises a "LockLessWrites" variable 320, "PendingUnmaps" variable 330, "RangeBitmap" variable 340, and "RefCount" variables 350.

In the synchronization method described herein, write IOs may be performed on either a "fast path" or a "slow path." When there are no pending unmap IOs for a sub-block 310, i.e., no pending unmap IOs targeting addresses 360 of the sub-block 310, incoming write IOs for that sub-block are performed on the fast path. On the fast path, a storage device 182 may execute write IOs without referencing RangeBitmap 340 and RefCounts 350. Without introducing significant overhead, the fast path allows for write IOs, which are significantly more common than unmap IOs, to execute efficiently.

On the fast path, when storage device 182 receives a write IO for sub-block 310, storage device 182 increments LockLessWrites 320. When a write IO is completed, storage device 182 decrements LockLessWrites 320. When LockLessWrites 320 is greater than zero, a sub-block 310 is essentially locked from any pending unmap IOs, which must wait for pending write IOs on the fast path to complete. The synchronization of executing write IOs on the fast path is discussed further below in conjunction with FIG. 4.

When there is at least one pending unmap IO for a sub-block 310, incoming write IOs for that sub-block 310 are performed on the slow path. On the slow path, storage device 182 references RangeBitmap 340, which is a bit map in which each bit corresponds to a range of addresses 360. The size of each range determines how many bits are required for RangeBitmap 340. Addresses 360 may be divided into, e.g., 64 ranges, each range containing 8 addresses 360, and RangeBitmap 340 may contain 64 bits.

When a bit of RangeBitmap 340 is set, the corresponding range has been locked for either an unmap IO or write IOs. Sub-block 310 also contains a RefCount 350 for each bit of RangeBitmap 340. In the embodiment described herein, each RefCount 350 stores a number of pending write IOs targeting addresses 360 of the corresponding range. Unmap IOs, which are significantly less common than write IOs, do not increment RefCounts 350. However, in other embodiments, each RefCount 350 may store either a number of pending write IOs or a number of pending unmap IOs, depending on whether a range has been locked for unmap or write IOs.

If storage device 182 locks a range of addresses 360 for an unmap IO, no incoming write IOs may be performed on that range until storage device 182 unlocks the range. Similarly, if storage device 182 locks a range of addresses 360 for write IOs, no incoming unmap IOs may be performed on that range until storage device 182 unlocks the range. Storage device 182 can determine whether a range has been locked for an unmap IO or for write IOs based on the RefCount 350 corresponding to the range. If the corresponding RefCount 350 stores a number greater than zero, the range has been locked for write IOs. Otherwise, if the corresponding RefCount 350 stores the number zero, the range has been locked for an unmap IO.

On the slow path, for each incoming write IO that is performed, storage device 182 first increments the RefCount 350 corresponding to the range containing the target address 360 of the write IO. When the write IO is completed, storage device 182 decrements RefCount 350. The synchronization of executing write IOs on the slow path is discussed further below in conjunction with FIG. 5.

Each time a storage device 182 receives an unmap IO, storage device 182 increments PendingUnmaps 330. Before executing the unmap IO, storage device 182 locks the range containing the target address 360 of the unmap IO. After the unmap IO is completed, storage device 182 unlocks the range and decrements PendingUnmaps 330. The synchronization of executing unmap IOs is discussed further below in conjunction with FIG. 6.

Figure 4:
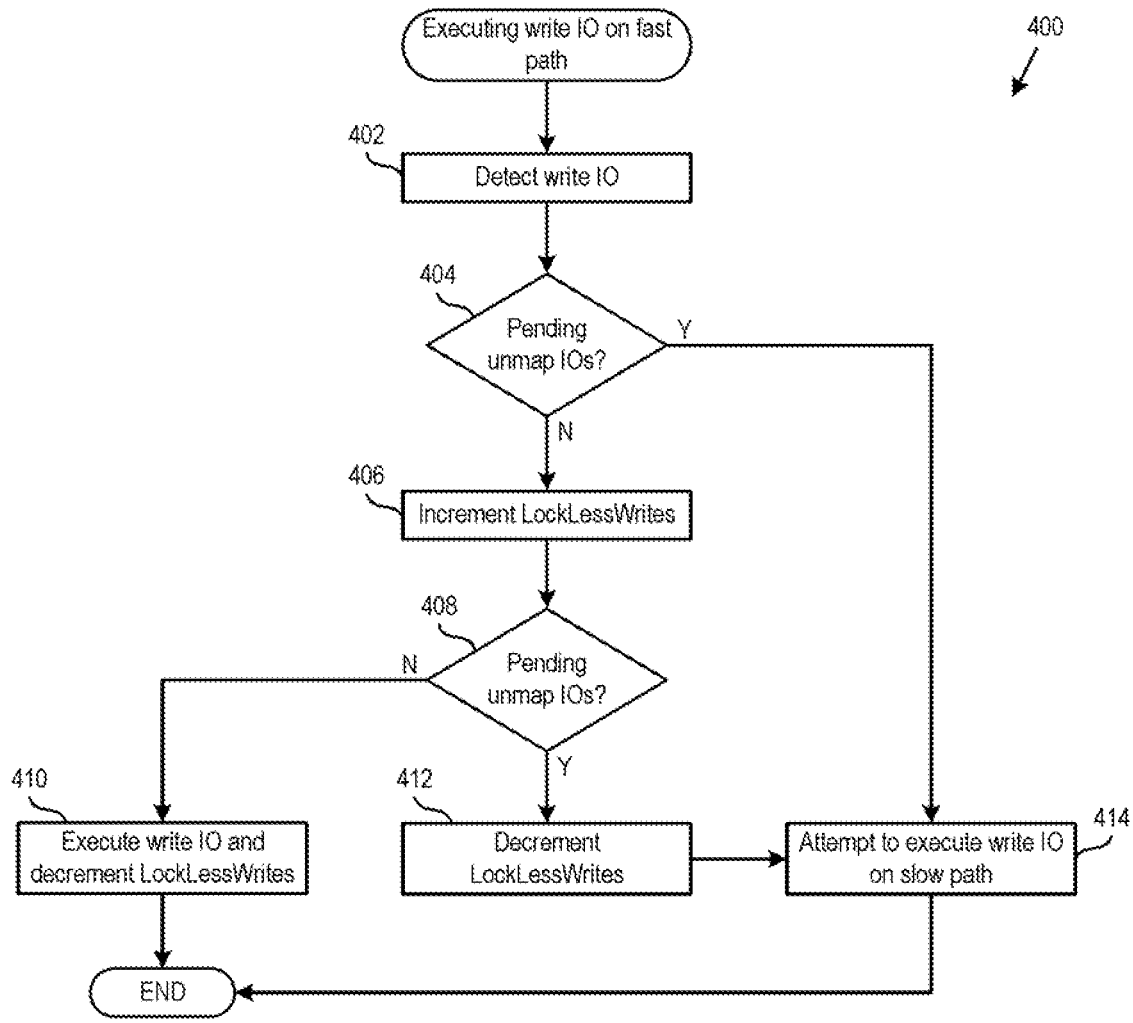
FIG. 4 is a flow diagram of steps carried out by a storage system to synchronously execute a write IO on a "fast path," according to an embodiment.

FIG. 4 is a flow diagram of steps carried out by storage system 180 to perform a method 400 of synchronously executing a write IO on the fast path, according to an embodiment. At step 402, a storage device 182 detects a write IO received from a VM 120, the write IO containing a target address 360 and data to write at the target address 360.

At step 404, storage device 182 locates the sub-block 310 containing the target address 360 and checks if PendingUnmaps 330 is greater than zero to determine if there are any pending unmap IOs. If there is a pending unmap IO, method 400 moves to step 414. Otherwise, method 400 move to step 406, and storage device 182 increments LockLessWrites 320. If, for example, at step 406, storage device 182 increments LockLessWrites 320 from zero to one, step 406 has the effect of locking the sub-block 310 from any unmap IOs executing until LockLessWrites 320 is decremented back to zero.

At step 408, storage device 182 checks PendingUnmaps 330 again to determine if any unmap IOs arrived at sub-block 310 since the previous check. If no unmap IOs arrived, method 400 moves to step 410, and storage device 182 executes the write IO by writing data to the target address 360. After the write IO completes, storage device 182 decrements LockLessWrites 320, and method 400 ends.

At step 408, if an unmap IO arrived at sub-block 310, method 400 moves to step 412, and storage device 182 decrements LockLessWrites 320 because storage device 182 cannot execute the write IO on the fast path. At step 414, storage device 182 attempts to execute the write IO on the slow path, as discussed further below in conjunction with FIG. 5. After step 414, method 400 ends.

Figure 5:
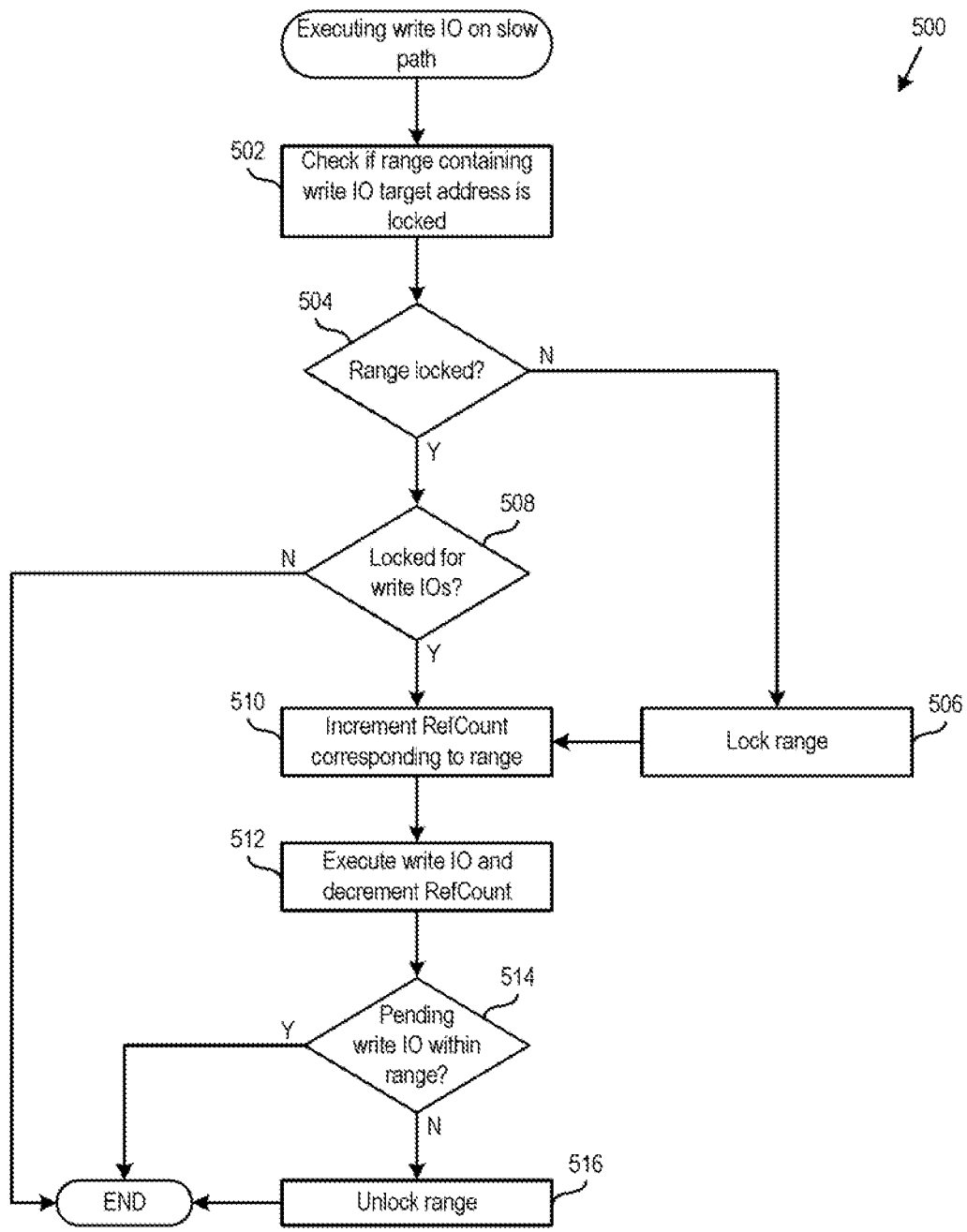
FIG. 5 is a flow diagram of steps carried out by a storage system to synchronously execute a write IO on a "slow path," according to an embodiment.

FIG. 5 is a flow diagram of steps carried out by storage system 180 to perform a method 500 of synchronously executing a write IO on the slow path, according to an embodiment. Method 500 is triggered by a storage device 182 determining that there is a pending unmap IO at the same sub-block 310 as the write IO.

At step 502, storage device 182 checks RangeBitmap 340 to determine if the range containing the target address 360 of the write IO has been locked, i.e., if the bit corresponding to the range is set. At step 504, if the range is not locked, method 500 moves to step 506, and storage device 182 locks the range for the write IO by setting the corresponding bit in RangeBitmap 340. Otherwise, if the range is locked at step 504, method 500 moves to step 508, and storage device 182 determines if the range is locked for write IOs or for an unmap IO by checking the RefCount 350 corresponding to the range.

If the range is locked for an unmap IO, method 500 ends, and the write IO cannot be performed until the unmap IO is completed. Otherwise, if the range is locked for write IOs, method 500 moves to step 510, and storage device 182 increments the RefCount 350 corresponding to the locked range. At step 512, storage device 182 executes the write IO by writing data at the target address 360. After the write IO is completed, storage device 182 decrements the RefCount 350.

At step 514, storage device 182 checks the RefCount 350 to determine if there are any other pending write IOs at the range, i.e., if the RefCount 350 is greater than zero. If there is at least one other pending write IO, method 500 ends. Otherwise, if there are no other pending write IOs, method 500 moves to step 516. At step 516, storage device 182 unlocks the range by unsetting the bit of RangeBitmap 340 corresponding to the range. After step 516, method 500 ends.

Figure 6:
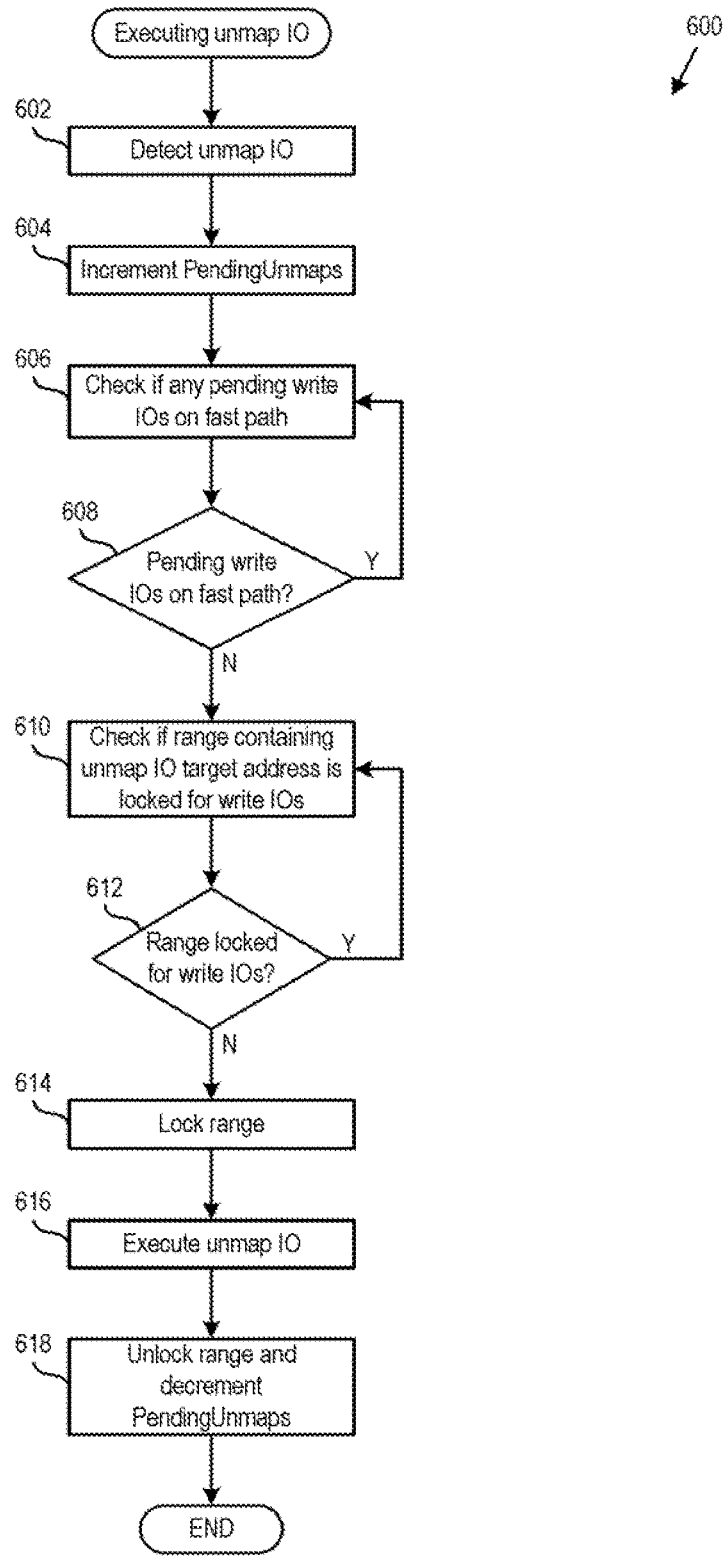
FIG. 6 is a flow diagram of steps carried out by a storage system to synchronously execute an unmap IO, according to an embodiment.

FIG. 6 is a flow diagram of steps carried out by storage system 180 to perform a method 600 of synchronously executing an unmap IO, according to an embodiment. At step 602, a storage device 182 detects an unmap IO received from a VM 120, the unmap IO containing a target address 360 of a file data block 206 to unmap.

At step 604, storage device 182 locates the sub-block 310 containing the target address 360 and increments PendingUnmaps 330. At step 606, storage device 182 checks if there are any pending write IOs executing on the fast path, i.e., if LockLessWrites 320 is greater than zero. At step 608, if there are pending write IOs executing on the fast path, method 600 returns to step 606, and storage device 182 checks again if there are any pending write IOs on the fast path. The unmap IO may not execute until all the pending write IOs on the fast path are completed.

At step 608, if there are no pending write IOs executing on the fast path, method 600 moves to step 610. At step 610, storage device 182 checks RangeBitmap 340 to determine if the range containing the target address 360 has been locked for write IOs, i.e., if the bit corresponding to the range is set. At step 612, if the range is not locked, method 600 moves to step 614. Otherwise, if the range is locked at step 612, method 600 returns to step 610, and storage device 182 checks again if the range containing the target address 360 has been locked for write IOs. Method 600 assumes that only one unmap IO may be in progress at a time. As such, if the bit is set at step 612, the bit is set for write IOs.

At step 614, assuming the range has been unlocked, storage device 182 locks the range for the unmap IO by setting the corresponding bit in RangeBitmap 340. At step 616, storage device 182 executes the unmap IO by deallocating the file data block 206 at the target address 360. Storage device 182 may immediately zero the file data block 206 or may zero the file data block 206 later when it is allocated to a file of a VM 120. At step 618, storage device 182 unlocks the range by unsetting the bit of RangeBitmap 340 corresponding to the range and decrements PendingUnmaps 330. After step 618, method 600 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of synchronously executing input/output operations (IOs) for a plurality of applications that use a file system of a storage device, the method comprising:
   detecting a first write IO including an instruction to write first data at a first address of the file system;
   in response to the detecting of the first write IO, determining that, within a first range of the file system comprising the first address, there are no pending unmap IOs for deallocating storage space of the storage device from files of the plurality of applications; and
   in response to the determining that there are no pending unmap IOs within the first range,
      locking the first range to prevent any incoming unmap IOs from deallocating storage space within the first range from the files of the plurality of applications, then
      writing the first data to the storage device at the first address, and then
      unlocking the first range.

2. The method of claim 1, wherein the file system is a virtual machine file system, the files of the plurality of applications are virtual disks of the virtual machine file system, the first write IO is a small computer system interface (SCSI) write command, and the incoming unmap IOs are SCSI unmap commands.

3. The method of claim 1, wherein the locking of the first range comprises incrementing a variable that indicates a number of pending write IOs for writing data at addresses of the file system within the first range, before any unmap IOs can deallocate storage space within the first range from the files of the plurality of applications, and the unlocking of the first range comprises decrementing the variable to zero.

4. The method of claim 1, wherein the first range further comprises a second address, the method further comprising:
   detecting a second write IO including an instruction to write second data at the second address;
   in response to the detecting of the second write IO, determining that there is a pending unmap IO for deallocating storage space within the first range from at least one file of an application;
   in response to the determining that there is the pending unmap IO within the first range, determining that a second range of the file system comprising the second address is not locked, the first range comprising the second range; and
   in response to the determining that the second range is not locked,
      locking the second range to prevent any incoming unmap IOs from deallocating storage space within the second range from the files of the plurality of applications, then
      writing the second data to the storage device at the second address, and then
      unlocking the second range.

5. The method of claim 4, wherein the locking of the second range comprises setting a bit within a bitmap, the bitmap corresponding to the first range and the bit corresponding to the second range, and wherein the unlocking of the second range comprises unsetting the bit.

6. The method of claim 1, wherein the first range further comprises a third address, the method further comprising:
   detecting an unmap IO including an instruction to deallocate storage space at the third address from a file of an application;
   in response to the detecting of the unmap IO, determining that, within the first range, there are no pending write IOs for writing data to the storage device;
   in response to the determining that there are no pending write IOs within the first range, determining that a third range of the file system comprising the third address is not locked, the first range comprising the third range; and
   in response to the determining that the third range is not locked,
      locking the third range to prevent any incoming write IOs from writing data within the third range, then
      deallocating the storage space at the third address from the file of the application, and then
      unlocking the third range.

7. The method of claim 6, further comprising:
   in response to the detecting of the unmap IO, incrementing a variable that indicates a number of pending unmap IOs for deallocating storage space within the first range from the files of the plurality of applications.

8. A non-transitory computer readable medium comprising instructions that are executable in a computer system, wherein the instructions when executed cause the computer system to carry out a method of synchronously executing input/output operations (IOs) for a plurality of applications that use a file system of a storage device, the method comprising:
   detecting a first write IO including an instruction to write first data at a first address of the file system;
   in response to the detecting of the first write IO, determining that, within a first range of the file system comprising the first address, there are no pending unmap IOs for deallocating storage space of the storage device from files of the plurality of applications; and
   in response to the determining that there are no pending unmap IOs within the first range,
      locking the first range to prevent any incoming unmap IOs from deallocating storage space within the first range from the files of the plurality of applications, then
      writing the first data to the storage device at the first address, and then
      unlocking the first range.

9. The non-transitory computer readable medium of claim 8, wherein the file system is a virtual machine file system, the files of the plurality of applications are virtual disks of the virtual machine file system, the first write IO is a small computer system interface (SCSI) write command, and the incoming unmap IOs are SCSI unmap commands.

10. The non-transitory computer readable medium of claim 8, wherein the locking of the first range comprises incrementing a variable that indicates a number of pending write IOs for writing data at addresses of the file system within the first range, before any unmap IOs can deallocate storage space within the first range from the files of the plurality of applications, and the unlocking of the first range comprises decrementing the variable to zero.

11. The non-transitory computer readable medium of claim 8, wherein the first range further comprises a second address, the method further comprising:
   detecting a second write IO including an instruction to write second data at the second address;
   in response to the detecting of the second write IO, determining that there is a pending unmap IO for deallocating storage space within the first range from at least one file of an application;

in response to the determining that there is the pending unmap IO within the first range, determining that a second range of the file system comprising the second address is not locked, the first range comprising the second range; and in response to the determining that the second range is not locked, locking the second range to prevent any incoming unmap IOs from deallocating storage space within the second range from the files of the plurality of applications, then writing the second data to the storage device at the second address, and then unlocking the second range.

12. The non-transitory computer readable medium of claim 11, wherein the locking of the second range comprises setting a bit within a bitmap, the bitmap corresponding to the first range and the bit corresponding to the second range, and wherein the unlocking of the second range comprises unsetting the bit.

13. The non-transitory computer readable medium of claim 8, wherein the first range further comprises a third address, the method further comprising:

detecting an unmap IO including an instruction to deallocate storage space at the third address from a file of an application;

in response to the detecting of the unmap IO, determining that, within the first range, there are no pending write IOs for writing data to the storage device;

in response to the determining that there are no pending write IOs within the first range, determining that a third range of the file system comprising the third address is not locked, the first range comprising the third range; and in response to the determining that the third range is not locked, locking the third range to prevent any incoming write IOs from writing data within the third range, then deallocating the storage space at the third address from the file of the application, and then unlocking the third range.

14. The non-transitory computer readable medium of claim 13, the method further comprising:

in response to the detecting of the unmap IO, incrementing a variable that indicates a number of pending unmap IOs for deallocating storage space within the first range from the files of the plurality of applications.

15. A computer system comprising:

a plurality of hosts in a cluster executing a plurality of applications; and a storage system comprising a storage device with a file system, wherein the storage system is configured to:

detect a first write input/output operation (IO) including an instruction to write first data at a first address of the file system;

in response to the detecting of the first write IO, determine that, within a first range of the file system comprising the first address, there are no pending unmap IOs for deallocating storage space of the storage device from files of the plurality of applications; and in response to the determining that there are no pending unmap IOs within the first range, lock the first range to prevent any incoming unmap IOs from deallocating storage space within the first range from the files of the plurality of applications, then write the first data to the storage device at the first address, and then unlock the first range.

16. The computer system of claim 15, wherein the file system is a virtual machine file system, the files of the plurality of applications are virtual disks of the virtual machine file system, the first write IO is a small computer system interface (SCSI) write command, and the incoming unmap IOs are SCSI unmap commands.

17. The computer system of claim 15, wherein the locking of the first range comprises incrementing a variable that indicates a number of pending write IOs for writing data at addresses of the file system within the first range, before any unmap IOs can deallocate storage space within the first range from the files of the plurality of applications, and the unlocking of the first range comprises decrementing the variable to zero.

18. The computer system of claim 15, wherein the first range further comprises a second address, and the storage system is further configured to:

detect a second write IO including an instruction to write second data at the second address;

in response to the detecting of the second write IO, determine that there is a pending unmap IO for deallocating storage space within the first range from at least one file of an application, in response to the determining that there is the pending unmap IO within the first range, determine that a second range of the file system comprising the second address is not locked, the first range comprising the second range; and in response to the determining that the second range is not locked, lock the second range to prevent any incoming unmap IOs from deallocating storage space within the second range from the files of the plurality of applications, then write the second data to the storage device at the second address, and then unlock the second range.

19. The computer system of claim 18, wherein the locking of the second range comprises setting a bit within a bitmap, the bitmap corresponding to the first range and the bit corresponding to the second range, and wherein the unlocking of the second range comprises unsetting the bit.

20. The computer system of claim 15, wherein the first range further comprises a third address, and the storage system is further configured to:

detect an unmap IO including an instruction to deallocate storage space at the third address from a file of an application;

in response to the detecting of the unmap IO, determine that, within the first range, there are no pending write IOs for writing data to the storage device;

in response to the determining that there are no pending write IOs within the first range, determine that a third range of the file system comprising the third address is not locked, the first range comprising the third range; and in response to the determining that the third range is not locked, lock the third range to prevent any incoming write IOs from writing data within the third range, then deallocate the storage space at the third address from the file of the application, and then unlock the third range.

\* \* \* \* \*